United States Patent [19]

Dendi

[11] Patent Number: 5,963,633
[45] Date of Patent: Oct. 5, 1999

[54] SYSTEM AND METHOD FOR BRANCHING A TELEPHONE CALL

[75] Inventor: Ranga R. Dendi, Plano, Tex.

[73] Assignee: MCI Communications Corporation, Washington, D.C.

[21] Appl. No.: 08/654,296

[22] Filed: May 28, 1996

[51] Int. Cl.⁶ .............................. H04M 7/00; H04M 3/42
[52] U.S. Cl. ........................ 379/220; 379/207; 379/212; 379/229; 379/230
[58] Field of Search ...................................... 379/202, 204, 379/205, 206, 207, 219, 220, 221, 229, 210, 211, 212, 214, 230

[56] References Cited

U.S. PATENT DOCUMENTS

5,432,845  7/1995  Burd et al. ........................... 379/207 X

Primary Examiner—Harry S. Hong

[57] ABSTRACT

A system and method for branching a telephone call. The system is a network having a first call branch connecting a pivot node and an origination node, a second call branch connecting the pivot node and a release node, and a third call branch connecting the release node and an alternate node. The method includes the steps of initializing the origination and release nodes to inform them of the pivot node's ability to branch the call; creating a fourth call branch between the pivot and destination nodes, and switching the call from the third call branch to the fourth call branch.

16 Claims, 14 Drawing Sheets

SYSTEM AND METHOD FOR BRANCHING A TELEPHONE CALL

RELATED APPLICATION

This application is related to a commonly-owned application, filed concurrently herewith, entitled "Facility Request to Pivot" having application Ser. No. 08/654,178 which is incorporated herein by reference.

BACKGROUND OF THE INVENTION

1. Field of the Invention

The present invention relates generally to systems and methods for network switching, and more particularly to efficient call routing in a telecommunications system.

2. Related Art

A conventional telecommunications network comprises three basic components: user terminals (for example, telephones), communications busses (also known as links; for example, telephone lines) and nodes. The nodes are used to selectively connect the user terminals via the links. A node is a functional entity employed to route a call, not a physical entity. Therefore, the correspondence between nodes and physical switches is not necessarily one-to-one.

In a typical telephone call, when an originating end user (hereinafter a "caller") places a call to a terminating end user (hereinafter a "called party"), the network creates a communications path by connecting the caller's user terminal (for example, a telephone) to the called party's user terminal, via a number of nodes, using communications busses. Occasionally, the called party will be busy, and will place the call "on hold" and/or in a queue. For example, this often happens when calling toll-free numbers. When this happens, the caller is faced with two options: he can (1) wait in the queue for his call to be answered, or (2) disconnect (that is, "hang up"). If the caller waits, his time is wasted for an unknown duration because he cannot make other calls. If the caller hangs up, he loses his place in the queue and the time he has already spent in the queue is wasted.

One approach to the problem is to provide the caller with a telephone having two separate lines and a "hold" function. When the caller is placed on "hold," he can then place that call on hold and make a call from the telephone's second line. The primary disadvantage of this terminal-based approach is that it requires a specialized telephone and a second phone line. Both items come at a significant cost to the caller.

Another approach is to implement a second phone line in a private branch exchange (PBX). The caller can then access the second line and the hold function by entering particular codes (for example, "*7" or the like) on the user's telephone. While this approach eliminates the need for a specialized telephone, it still requires that a separate second call be placed, requiring twice the network resources.

What is needed is a system and method to permit a caller to place other calls while retaining his original call, without requiring a special telephone or a separate second call.

SUMMARY OF THE INVENTION

The present invention is a system and method that permits an end user who has placed a call in a telecommunications network to establish a new call branch from an existing call without disconnecting the old call branch. A call branch is a connection between two nodes. The present invention also permits any end user to switch between old and new call branches once the new call branch is established. The present invention also permits any end user to release either call branch.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE FIGURES

The present invention will be described with reference to the accompanying drawings, wherein.

DETAILED DESCRIPTION OF THE PREFERRED EMBODIMENTS

I. Introduction

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. In a preferred embodiment, the present invention is implemented using the technique disclosed in the commonly-owned copending application entitled "Facility Request to Pivot" having application number (U.S. patent application Ser. No. 08/654,178, Attorney Docket Number RIC-95-133; 1452.0770000), which is incorporated herein by reference.

The present invention is a system and method that permits an end user who has placed a call in a telecommunications network to establish a new call branch without disconnecting the old call branch. The present invention also permits any end user to switch between old and new call branches once the new call branch is established. The present invention also permits any end user to release either call branch.

Figure 1:
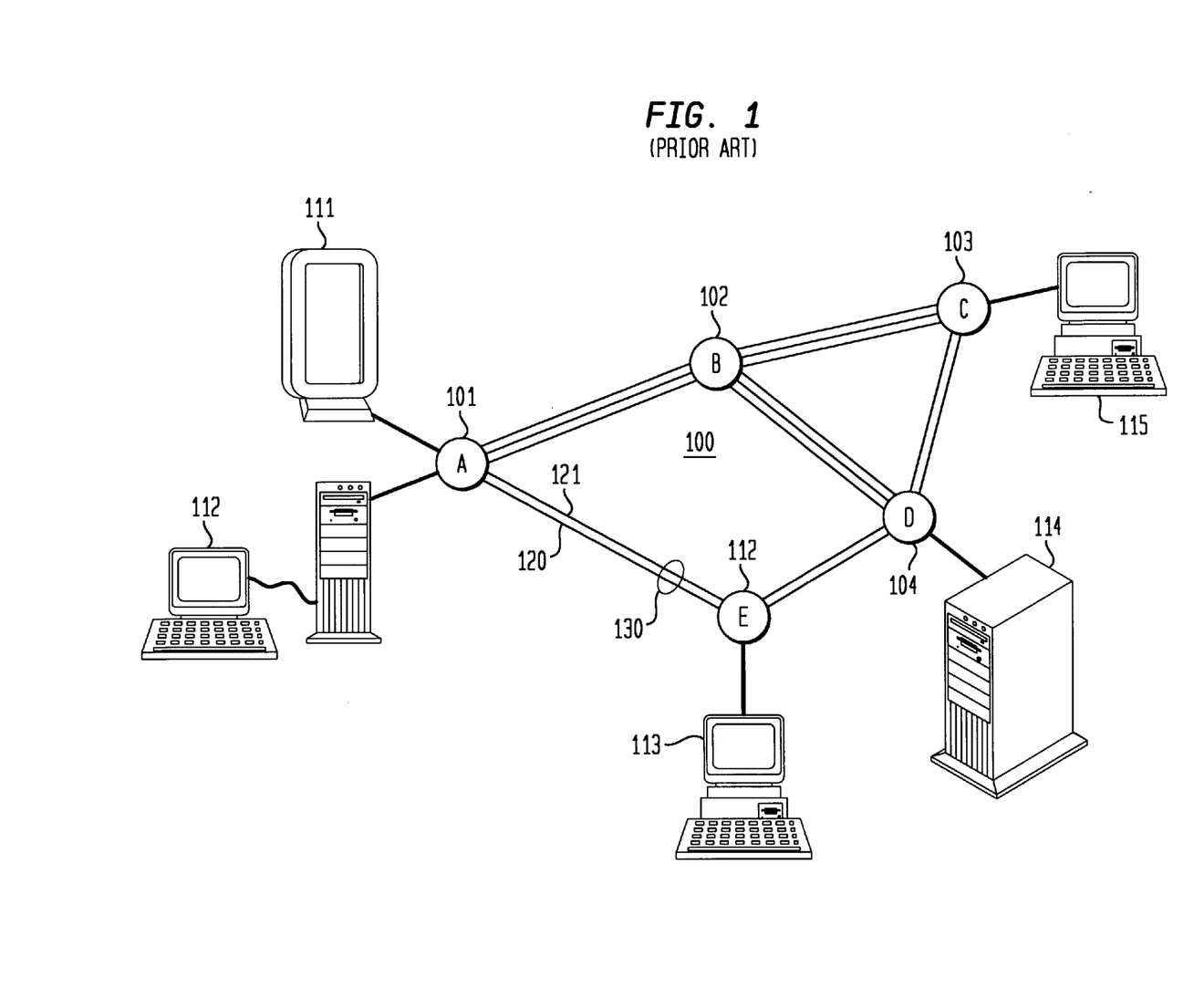
FIG. 1 shows a typical communications network consisting of nodes connected by links.

Before describing the operation of the present invention, an environment in which the invention may be employed is first described. FIG. 1 shows a typical communications network 100 consisting of nodes 101–105 connected by links 120–121. The communications system 100 routes data so as to effectively interconnect data equipment 111–115 that are located at a distance from one another. This routing is accomplished within the network by the ability of each node 101 to perform one-of-many switching functions, that is, to accept data entering along one link and send the data out along a different link. Under normal circumstances, the switching within each node is directed by some overall network routing logic commonly understood by those skilled in the art.

For purposes of discussion, the operation of the present invention is divided into three phases: initialization, call branching, and call branch switching. In the initialization phase, as the call is extended from node to node, nodes which support the call branch capability inform adjacent nodes that they can honor call branch requests. In the call branching phase, the caller requests a new call branch, the new call branch is established and activated, and the old call branch is "parked". When a call branch is parked, it becomes inactive (that is, it is disconnected from the other end user), but is retained (that is, the physical resources associated with the parked portion of the call branch are not released). A call branch is activated by connecting it with a call. In the call branch switching phase, any end user (that is, any party to the call) can switch between, or release, call branches.

II. Initialization

The initialization phase commences when a call is extended to a node which supports the call branch capability of the present invention. When this happens, the node informs the nodes immediately adjacent to it in the call path that it can honor call branch requests. Once the two adjacent nodes receive this indication, call branching may be invoked at either node.

Figure 2:
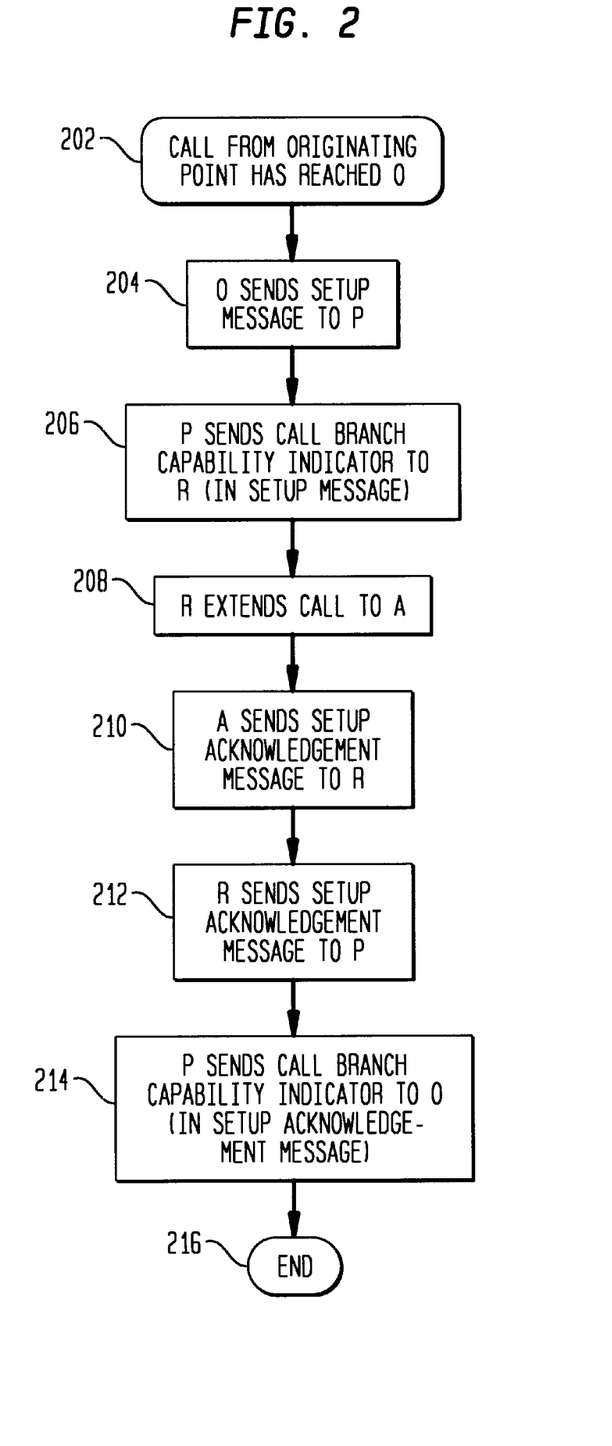
FIG. 2 is a flowchart depicting the operation of the initialization phase of a preferred embodiment of the present invention.
Figure 3A:
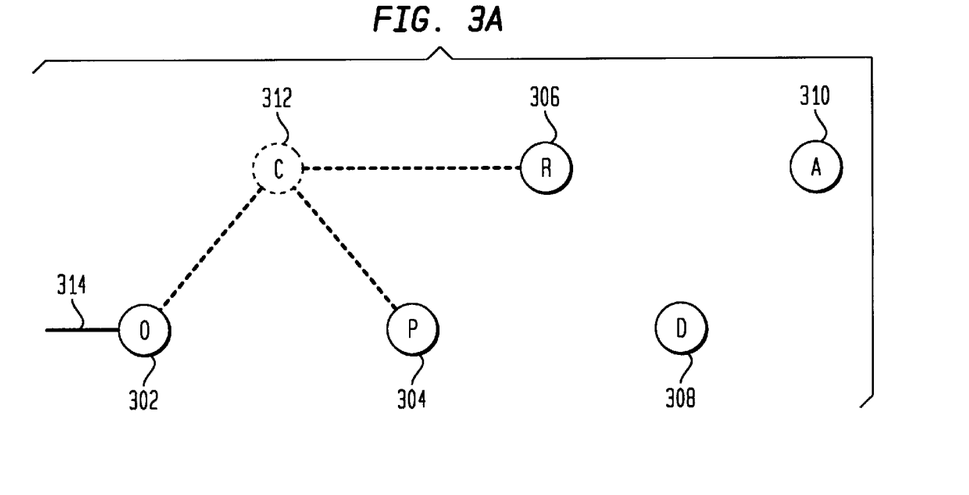
FIGS. 3A, 3B, 5A, 5B, 7A, 7B, 7C, 9A, 9B and 9C depict a network useful in describing the operation of the present invention.
Figure 3B:
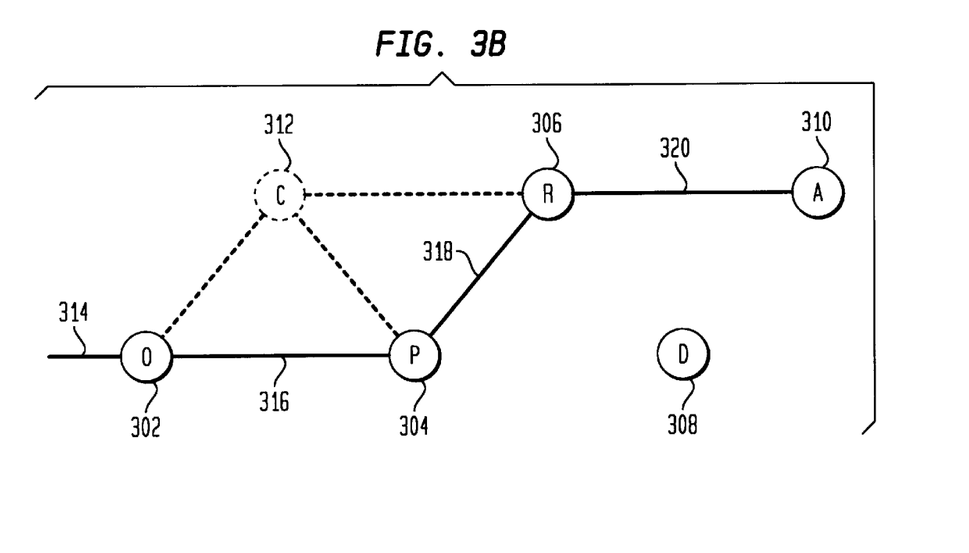

FIG. 2 is a flowchart depicting the initialization phase. FIG. 3 depicts a network useful in describing the operation of the present invention. The network comprises five nodes; for purposes of discussion, these nodes are termed "origination" node 302, "pivot" node 304, "release" node 306, "destination" node 308, and "alternate" node 310. Typically, "origination" node 302 is connected, directly or indirectly, to an originating end user (for example, the party placing a call) at an originating user terminal (not shown). Destination node 308 and alternate node 310 are each eventually connected, directly or indirectly, to end users (for example, parties to whom a call is placed or branched) at terminating user terminals (also not shown); alternatively, either or both destination node 308 and alternate node 310 can be a Customer Premises Equipment (CPE) such as a private branch exchange (PBX) or a telephone.

The network of FIG. 3 also comprises a "controller" 312; controller 312 is not a node, but rather a logical construct that can reside in any one of origination node 302, pivot node 304, and release node 306. Controller 312 maintains the states of all the call branches pertaining to a particular call and controls call branch creation and call branch switching for that call. According to a preferred embodiment of the present invention, there is only one controller 312 for a particular call.

According to a preferred embodiment of the present invention, pivot node 304, origination node 302 and release node 306 support common channel signaling (CCS); destination node 308 and alternate node 310 may or may not support CCS. CCS is a method of signaling whereby the paths taken by control signals are independent of the associated communications path. CCS can be contrasted to inband signaling, where the path taken by the control signals is the same as the associated communications path.

In a telecommunications network, a call from an originating end user to a terminating end user is typically established by "setting up" call branches from node to node from the originating user terminal to the terminating user terminal. For example, in FIG. 3A, a call branch 314 has been set up between origination node 302 and an originating user terminal (not shown), possibly via other nodes (not shown). Thus, the call from the originating user terminal has been extended to origination node 302.

According to a preferred embodiment of the present invention, in the initialization phase, the call is extended through a pivot node 304, which is a node having the capability to perform call branching. As the call is established, pivot node 304 informs the adjacent nodes in the call path (origination node 302 and release node 306) of its call branch capability.

The establishment (also termed "setup") of a call branch is typically a two-step process. First, when a node in a call (that is, a node connected by call branches, either directly or indirectly, to an originating user terminal) determines that a call branch should be set up to a second node, the node sends a "setup message" to the second node requesting a call branch. Once the call has been extended to the terminating end user, the second node responds by sending a "setup acknowledgment message" to the first node indicating that the call branch has been set up.

The initialization phase is now described in detail with reference to FIGS. 2 and 3. In a step 202, a call from the originating user terminal has been extended to origination node 302 as depicted in FIG. 3A. Once origination node 302 has determined that the call should be extended to pivot node 304, origination node 302 sends a setup message to pivot node 304, as shown in a step 204, thereby establishing call branch 316. A node typically determines to which node a call should be extended by consulting a database, as would be apparent to one skilled in the relevant art. Once pivot node 304 determines that the call should be extended to release node 306, pivot node 304 sends a setup message to release node 306, as shown in a step 206, thereby establishing call branch 318. The setup message contains a call branch capability indicator that indicates that pivot node 304 is capable of the call branch function. When release node 306 determines that the call should be extended to alternate node 310, release node 306 extends the call to alternate node 310 via call branch 320, as shown in a step 208.

After the call is extended to the terminating user terminal, alternate node 310 sends a setup acknowledgment message to release node 306, as shown in a step 210. When release node 306 receives the setup message, it responds by sending a setup acknowledgment message to pivot node 304, as shown in a step 212. Pivot note 304, which is a call branch capable node, responds by sending a setup acknowledgment message to origination node 302 containing a call branch capability indicator, as shown in a step 214. The resulting network configuration is shown in FIG. 3B. The call is now ready for call branching.

III. Call Branching

The call branching phase commences when either of the end users—the originating end user or the terminating end user—requests a call branch. When this happens, the old call branch (here, call branch 320) is "parked" and pivot node 304 sets up and activates a new call branch. When a call branch is parked, it becomes inactive, but is retained (that is, the call branch is disconnected from the other end user, but the physical resources associated with the parked portion of the call branch are not released). A call branch is activated by connecting it with a call.

Typically, a call will contain more than one node that is capable of call branching. A variety of strategies can be employed to determine at which of the call branch capable nodes the call should be branched. In one embodiment of the present invention, the call is branched as near to the terminating end user as possible. Other strategies can be employed without departing from the spirit and scope of the present invention, as would be apparent to one skilled in the relevant art.

Figure 4A:
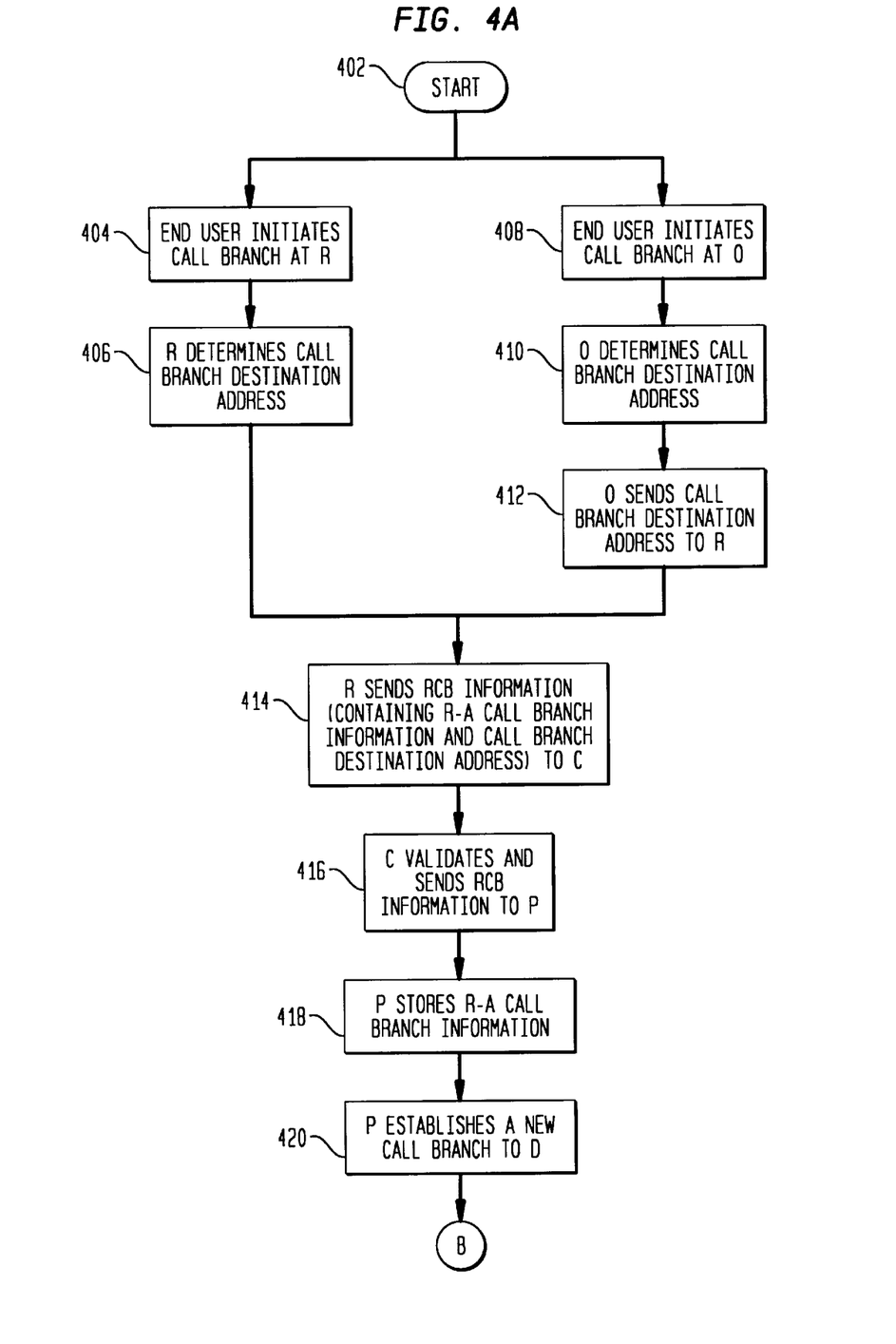
FIGS. 4A and 4B are flowcharts depicting the operation of the call branching phase of a preferred embodiment of the present invention.
Figure 4B:
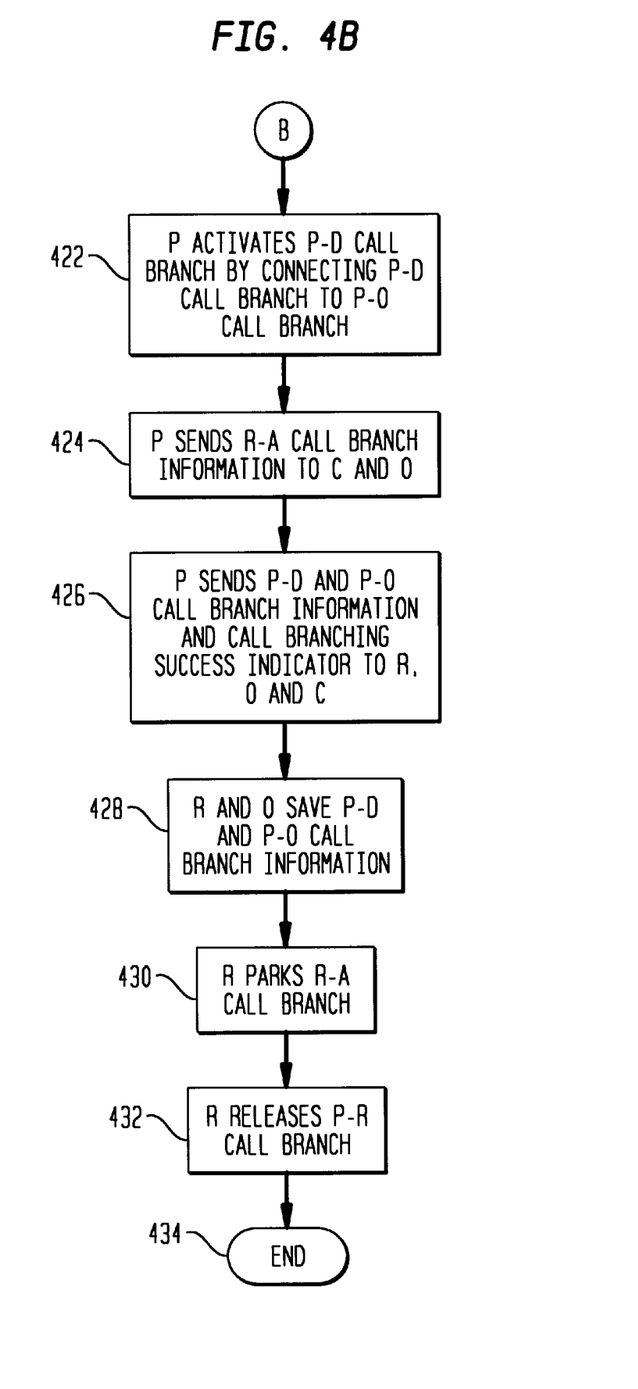

The call branching phase is now described in detail. FIG. 4 is a flowchart depicting the operation of the call branching phase of a preferred embodiment of the present invention. The call branching phase of the present invention will be described with reference to FIG. 5, which further depicts the network of FIG. 3. The call branching operation can be initiated by either end user at either origination node 302 or release node 306, depending on the provisioning of the service. If call branching is initiated at release node 306, as shown in a step 404, then release node 306 determines the call branch destination address as shown in a step 406. The call branch destination address comprises the address of the node—in this case destination node 308—to which the call should be branched. The determination of the node to which the call should be branched is similar to the determination of the node to which a call should be extended, which is described above. However, if the call branching operation is initiated at origination node 302, as shown in a step 408, then origination node 302 determines the call branch destination address, as shown in a step 410. Origination node 302 then sends the call branch destination address to release node 306, as shown in a step 412.

When the call branch destination address is available at release node 306, then release node 306 sends Request to Call Branch (RCB) information to controller 312, as shown in a step 414. The RCB information contains the node address of destination node 308 and call branch information for call branch 320 hereinafter referred to as R-A call branch 320). The R-A call branch information contains the node address for release node 306 and a unique identifier for the call (hereinafter referred to as the "call ID"). Controller 312 validates and sends the RCB information to pivot node 304, as shown in a step 416.

Figure 5A:
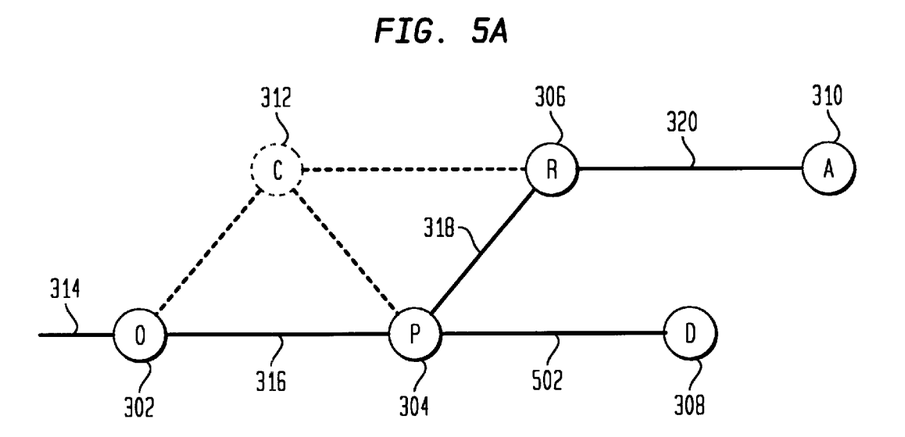

The call branching function is invoked at pivot node 304 on reception of the RCB information. Pivot node 304 stores the R-A call branch information to support future call branch switching, as shown in a step 418. Pivot node 304 then extends the call to destination node 308 as shown in a step 420, creating a new call branch 502. Pivot node 304 then activates call branch 502 (hereinafter termed P-D call branch 502) by connecting P-D call branch 502 to call branch 316 (hereinafter termed P-O call branch 316) as shown in a step 422. Pivot node 304 also forwards the R-A call branch information to controller 312 and to origination node 302 to support the future invocation of the call branch switching function at pivot node 304, as shown in a step 424. The resulting network configuration is depicted in FIG. 5A.

Figure 5B:
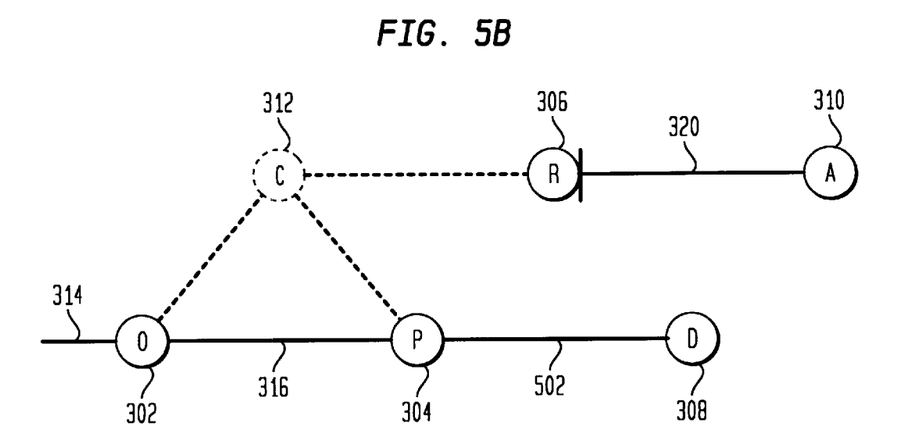

Pivot node 304 then sends P-D and P-O call branch information, which contains the address of pivot node 304, the call ID, and a call branching success indicator to release node 306, origination node 302, and controller 312, as shown in a step 426. The P-D call branch information contains the node address for pivot node 304 and the call ID. On receipt of this information, release node 306 and origination node 302 then store the P-D and P-O call branch information, as shown in a step 428. Because both origination node 302 and release node 306 possess the P-D and P-O call branch information, the call branch switching operation may now be invoked at either node. Finally, release node 306 parks R-A call branch 320 as shown in a step 430 and releases call branch 318 (hereinafter termed P-R call branch 318), as shown in a step 432. The resulting network configuration is shown in FIG. 5B. In FIG. 5B, the parked condition of R-A call branch 320 is indicated by a vertical line at release node 306.

Now, by virtue of the call branching operation, a new call branch (P-D call branch 502) has been established and activated, extending the call to destination node 308, and the old call branch (R-A call branch 320) has been parked. The call is now ready for call branch switching.

IV. Call Branch Switching

The call branch switching phase commences when any of the end users—the originating end user or either of the terminating end users—requests call branch switching. When this happens, the parked call branch is activated and the current call branch is parked or released, depending on the request. Call branch switching can be invoked whenever a parked call branch is available.

The call branch switching function will be discussed in two parts. In the first part, switching is from P-D call branch 502 to R-A call branch 320 (that is, activating R-A call branch 320 and parking or releasing P-D call branch 502). The second part describes switching from R-A call branch 320 to P-D call branch 502 (that is, activating P-D call branch 502 and parking or releasing R-A call branch 320). The first and second parts can be repeated alternately until one of call branches 320 and 502 is released.

A. First Part

Figure 6A:
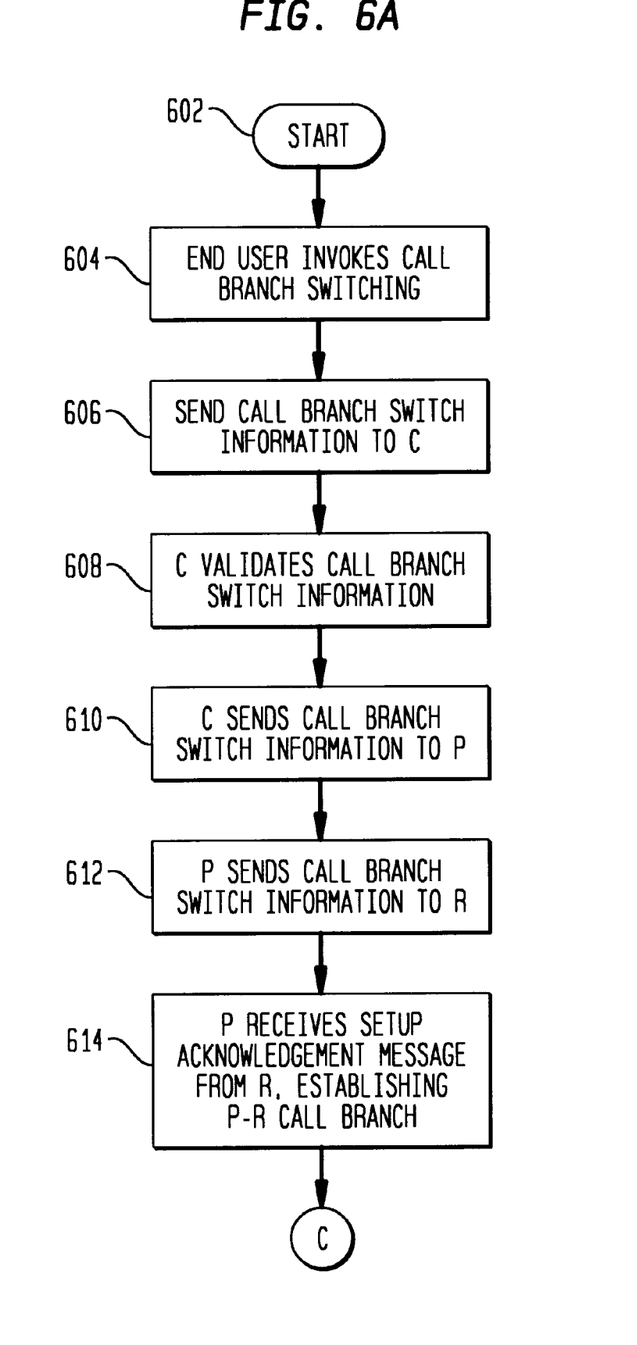
FIGS. 6A and 6B are flowcharts depicting the operation of the first part of the call branch switching phase of a preferred embodiment of the present invention.
Figure 6B:
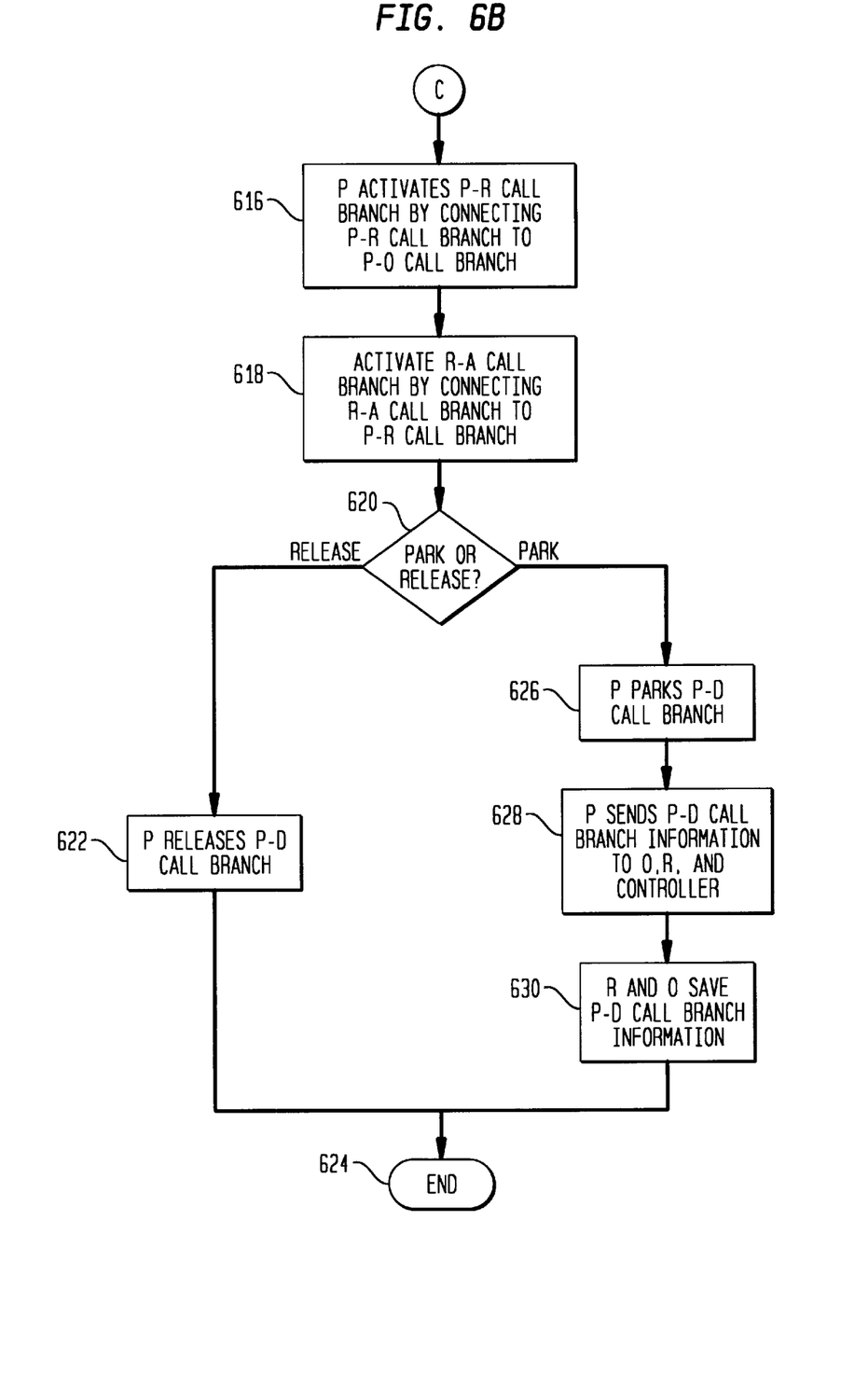

The first part of the call branch switching phase will now be described in detail. FIG. 6 is a flowchart depicting the operation of the first part of the call branch switching phase of a preferred embodiment of the present invention. The first part of the call branch switching phase of the present invention will be described with reference to FIG. 7, which further depicts the network of FIG. 3. When the first part of the call branch switching phase begins, R-A call branch 320 has been parked, and P-D call branch 502 is active, as shown in FIG. 5B.

Call branch switching may be invoked by any of the end users—the originating end user or either of the terminating end users. Call branch switching may be invoked at release node 306 at any time after release node 306 receives the P-D call branch information. Call branch switching may be invoked at origination node 302 at any time after origination node 302 receives the R-A call branch information.

Referring now to FIG. 6, when an end user invokes call branch switching, as shown in a step 604, call branch switch information is sent to controller 312, as shown in a step 606. If call branch switching is invoked at origination node 302, then the call branch switch information contains the R-A and P-O call branch information and is sent by origination node 302 to controller 312; if call branch switching is invoked at release node 306, then the call branch switch information contains the R-A call branch information and either the P-D or P-O call branch information, and is sent by release node 306 to controller 312. In either case the call branch switch information also contains an indication to either release or park P-D call branch 502.

Controller 312 then validates the call branch switch information to determine whether the call branch switching is permissible, as shown in a step 608. Validation can include, for example, avoiding race conditions that arise when call branch switching is invoked at origination node 302 and release node 306 simultaneously. Controller 312 then sends the call branch switch information to pivot node 304, as shown in a step 610. In a step 612, pivot node 304 initiates a new call branch 718 (hereinafter termed new P-R call branch 718) to release node 306 by sending a setup message containing the call branch switch information, as shown in a step 612. Note that new P-R call branch 718 does not necessarily employ the same physical resources as previously-released P-R call branch 318.

Figure 7A:
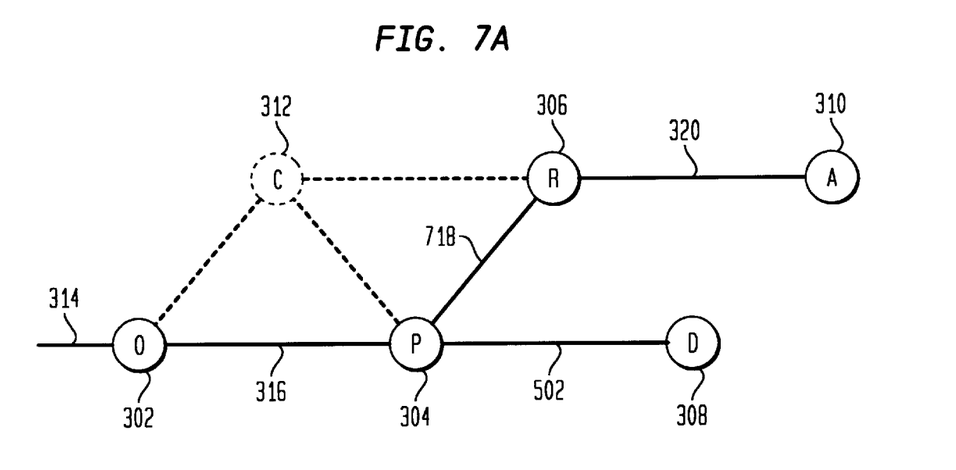
Figure 7B:
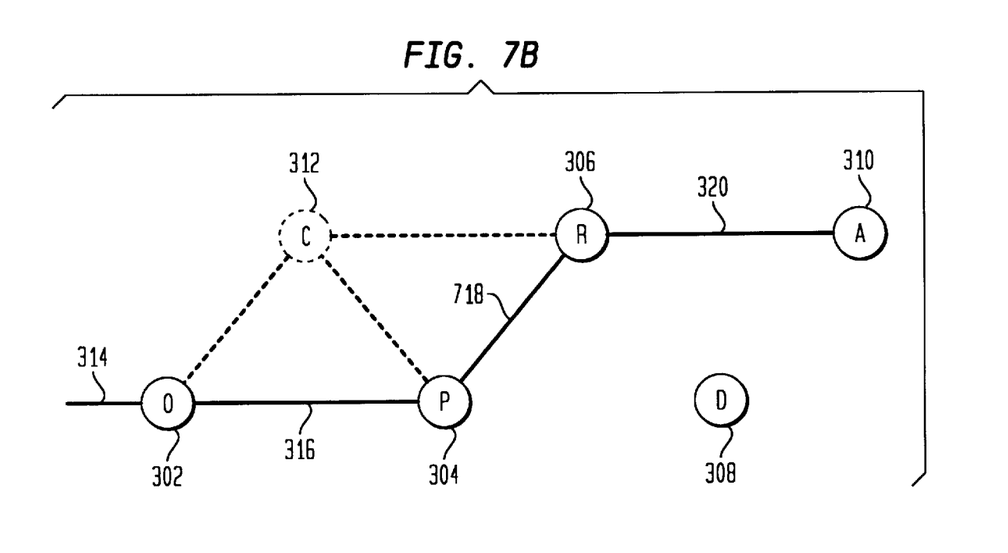

Pivot node 304 receives a setup acknowledgment message from release node 306 indicating successful establishment of new P-R call branch 718, as shown in a step 614. Then, in a step 616, pivot node 304 activates new P-R call branch 718 by connecting it to P-O call branch 316. In a step 618, R-A call branch 320 is activated by connecting it to new P-R call branch 718. The resulting network configuration is shown in FIG. 7A.

Processing then diverges based on whether the end user invoking the call branch switching operation has requested that the old call branch be parked or released, as shown in a step 620. If the end user has requested that the old call branch be released then pivot node 304 releases P-D call branch 502, as shown in a step 622, resulting in the network configuration depicted in FIG. 7B.

Alternatively, if the end user has requested that the old call branch be parked, then pivot node 304 parks P-D call branch 502, as shown in a step 626. In a step 628, pivot node 304 sends the P-D call branch information to origination node 302, release node 306 and controller 312. Finally, release node 306 and origination node 302 save the P-D call branch information for future call branch switching operations, as shown in a step 630. This results in the network configuration shown in FIG. 7C, where the parked condition of P-D call branch 502 is indicated by a vertical line at pivot node 304.

B. Second Part

Figure 7C:
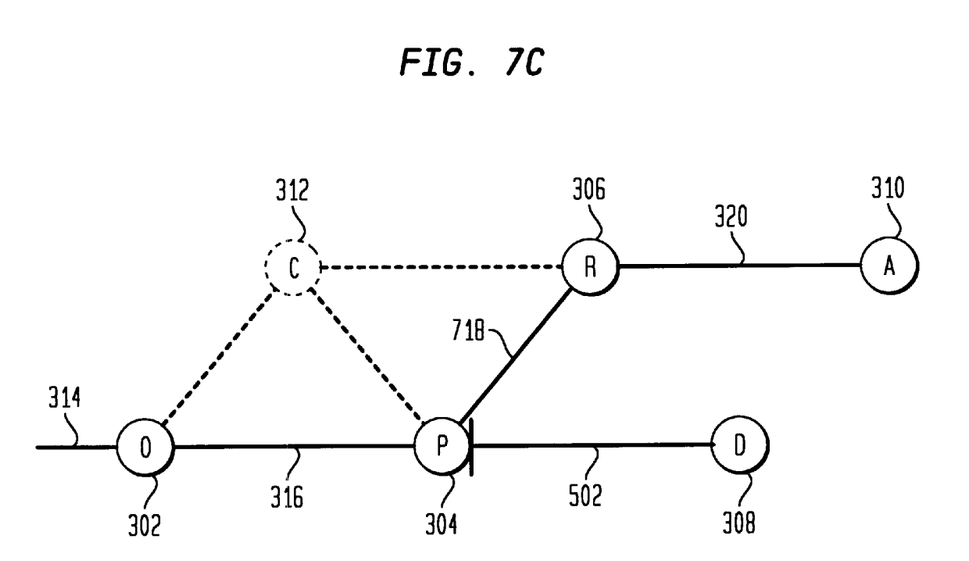
Figure 8A:
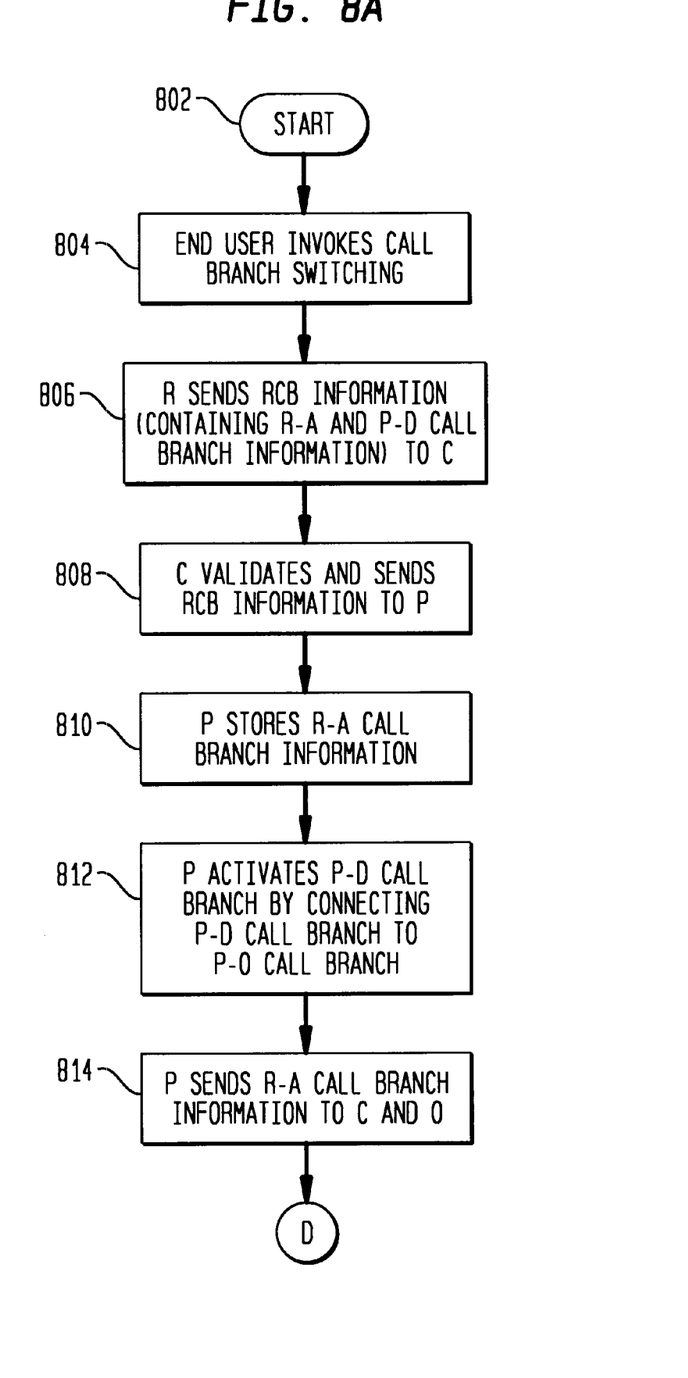
FIGS. 8A and 8B are flowcharts depicting the operation of the second part of the call branch switching phase of a preferred embodiment of the present invention.
Figure 8B:
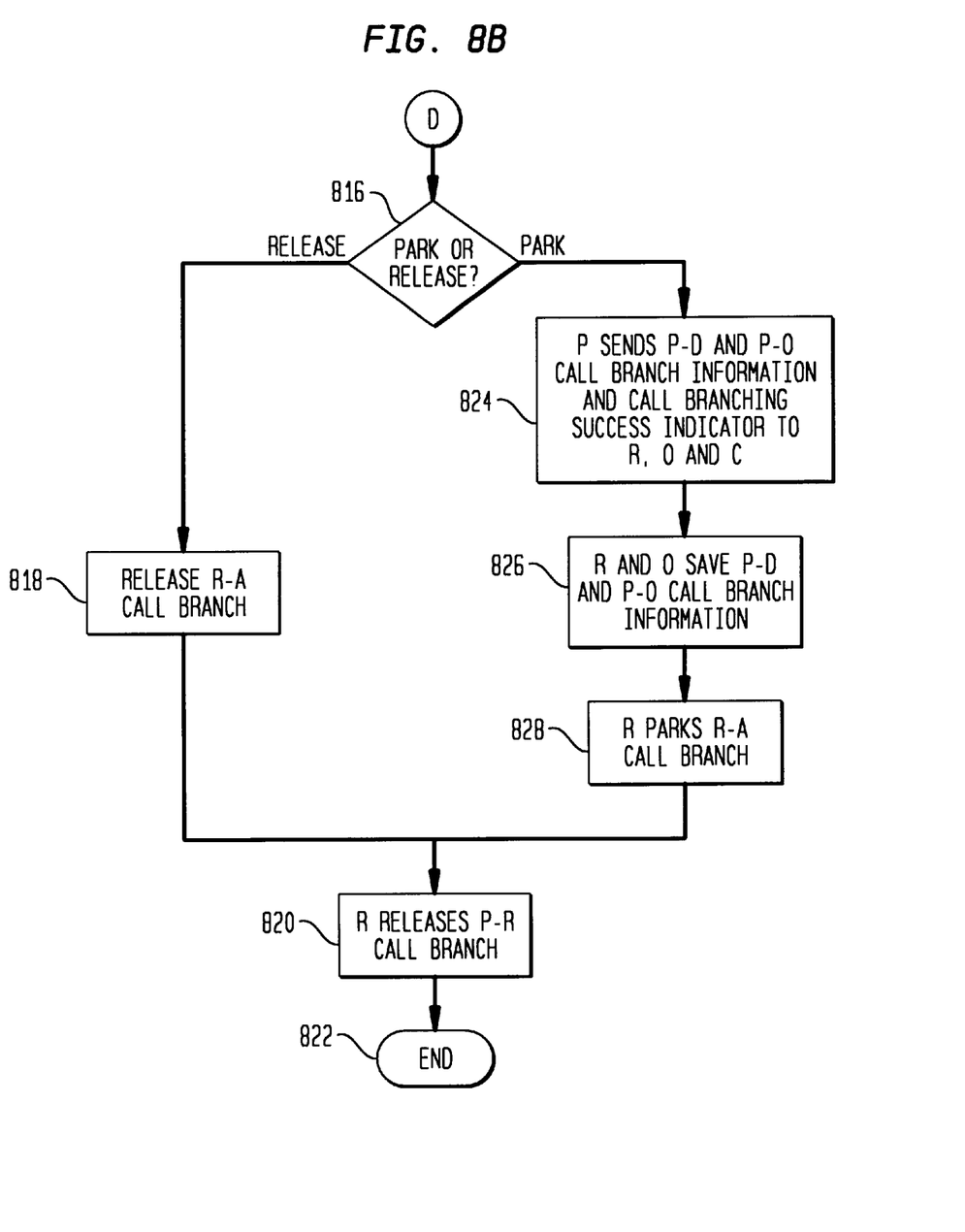

The second part of the call branch switching phase will now be described in detail. FIG. 8 is a flowchart depicting the operation of the second part of the call branch switching phase of a preferred embodiment of the present invention. The second part of the call branch switching phase of the present invention will be described with reference to FIG. 9, which further depicts the network of FIG. 3. When the second part of the call branch switching phase begins, P-D call branch 502 has been parked, and R-A call branch 320 is active, as shown in FIG. 7C.

Referring now to FIG. 8, when an end user invokes call branch switching, as shown in a step 804, release node 306 sends Request to Call Branch (RCB) information to controller 312, as shown in a step 806. The RCB information contains R-A and P-D call branch information, and an indication to either release or park R-A call branch 320. Call branch switching may be invoked by any of the end users—the originating end user or either of the terminating end users. Controller 312 validates and sends the RCB information to pivot node 304, as shown in a step 808.

Figure 9A:
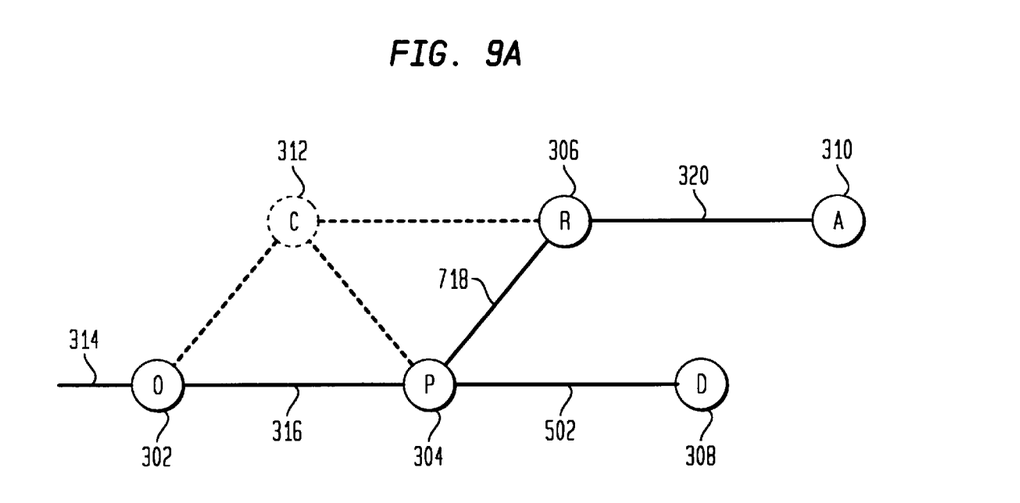

The call branch switching function is invoked at pivot node 304 on reception of the RCB information. Pivot node 304 stores the R-A call branch information to support future call branch switching, as shown in a step 810. Pivot node 304 then activates P-D call branch 502 by connecting P-D call branch 502 to P-O call branch 316, as shown in a step 812. Pivot node 304 also forwards the R-A call branch information to controller 312 and to origination node 302 to support the future invocation of the call branch switching function at pivot node 304, as shown in a step 814. The resulting network configuration is depicted in FIG. 9A.

Figure 9B:
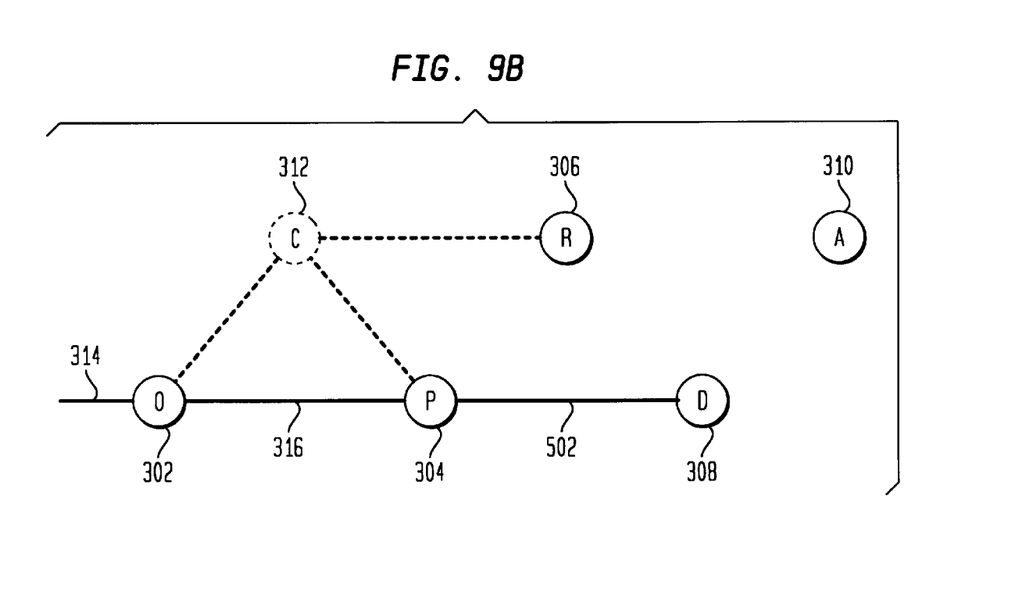

Processing then diverges based on whether the end user invoking the call branch switching operation has requested that the old call branch be parked or released, as shown in a step 816. If the end user has requested that the old call branch be released then R-A call branch 320 is released, as shown in a step 816, and P-R call branch 718 is released, as shown in a step 820. The resulting network configuration is shown in FIG. 9B.

Figure 9C:
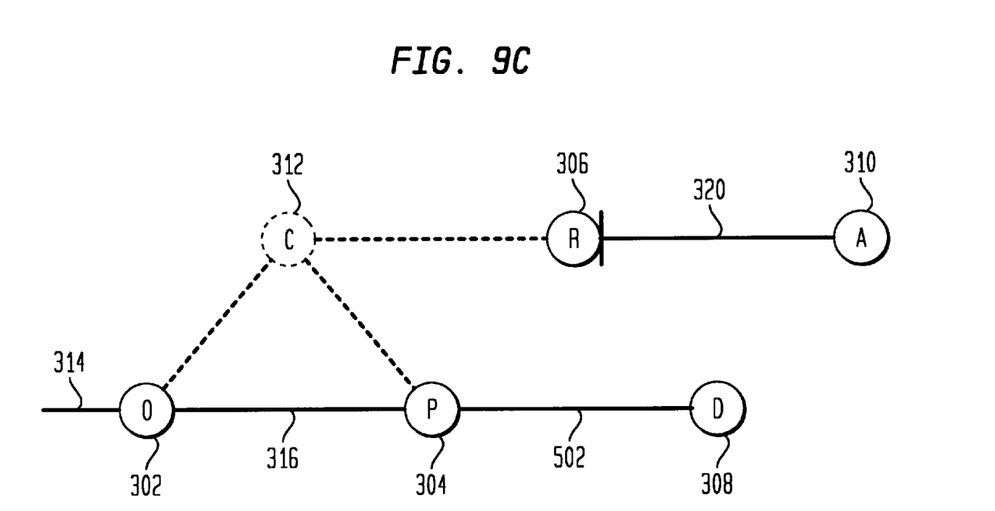

Alternatively, if the end user has requested that the old call branch be parked, then pivot node 304 sends P-D and P-O call branch information and a call branching success indicator to release node 306, origination node 302, and controller 312, as shown in a step 824. The P-D and P-O call branch information contains the node address for pivot node 304 and the call ID. On receipt of this information, release node 306 and origination node 302 then store the P-D and P-O call branch information, as shown in a step 826. Because both origination node 302 and release node 306 possess the P-D and P-O call branch information, the call branch switching operation may now be invoked at either node. Finally, release node 306 parks R-A call branch 320 as shown in a step 828 and releases P-R call branch 718, as shown in a step 820. The resulting network configuration is shown in FIG. 9C. In FIG. 9C, the parked condition of R-A call branch 320 is indicated by a vertical line at release node 306.

Now, by virtue of the second part of the call branch switching operation, a parked call branch (P-D call branch 502) has been activated and the old call branch (R-A call branch 320) has been parked. The call is now ready for further call branch switching.

V. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. In a telecommunications network supporting a call having a first call branch connecting a pivot node and an origination node, a second call branch connecting the pivot node and a release node, and a third call branch connecting the release node and an alternate node, a method for branching the call to a destination node and switching call branches, comprising the steps of:

(a) initializing the origination and release nodes;

(b) extending a fourth call branch between the pivot and destination nodes, wherein said fourth call branch and the first call branch are parts of a single call; and (c) switching the call from the third call branch to said fourth call branch.

2. The method of claim 1, further comprising the step of:

(d) switching the call from said fourth call branch to the third call branch.

3. The method of claim 1, wherein step (a) comprises the step of sending a call branch capability indicator from the pivot node to the origination and release nodes.

4. The method of claim 1, wherein step (b) comprises the steps of:

(i) receiving a request to create said fourth call branch;

(ii) determining an address identifying the destination node; and (iii) sending a first information to the pivot node, said first information identifying the third call branch and containing said address.

5. The method of claim 4, wherein step (b) further comprises the step of validating said first information to determine the permissibility of creating said fourth call branch and switching the call.

6. The method of claim 1, wherein step (c) comprises the steps of:

(i) connecting said fourth call branch to the first call branch;
(ii) parking the third call branch at the release node; and
(iii) releasing the second call branch.

7. The method of claim 2, wherein step (d) comprises the steps of:
(i) receiving a request to switch call branches;
(ii) sending a second information to the pivot node, said second information identifying the third call branch and at least one of the first call branch and said fourth call branch;
(iii) creating a further call branch between the pivot and release nodes;
(iv) connecting said further call branch to the first call branch;
(v) connecting said further call branch to the third call branch; and
(vi) performing one of:
(1) parking said fourth call branch at the pivot node; and
(2) releasing said fourth call branch.

8. The method of claim 7, wherein step (d) further comprises the step of validating said second information to determine the permissibility of switching the call.

9. A telecommunications network for branching calls and switching call branches, wherein the network supports a call having a first call branch connecting a pivot node and an origination node, a second call branch connecting the pivot node and a release node, and a third call branch connecting the release node and an alternate node, the network comprising:
initializing means for initializing the origination and release nodes;
branching means for extending a fourth call branch between the pivot and destination nodes, wherein said fourth call branch and the first call branch are parts of a single call; and
first switching means for switching the call from the third call branch to said fourth call branch.

10. The network of claim 9, further comprising second switching means for switching the call from said fourth call branch to the third call branch.

11. The network of claim 9, wherein said initializing means comprises means for sending a call branch capability indicator from the pivot node to the origination and release nodes.

12. The network of claim 9, wherein said branching means comprises:
means for receiving a request to create said fourth call branch;
means for determining an address identifying the destination node; and
means for sending a first information to the pivot node, said first information identifying the third call branch and containing said address.

13. The network of claim 12, wherein said branching means further comprises means for validating said first information to determine the permissibility of creating said fourth call branch and switching the call.

14. The network of claim 9, wherein said first switching means comprises:
means for connecting said fourth call branch to the first call branch;
means for parking the third call branch at the release node; and
means for releasing the second call branch.

15. The network of claim 10, wherein said second switching means comprises:
means for receiving a request to switch call branches;
means for sending a second information to the pivot node, said second information identifying the third call branch and at least one of the first call branch and said fourth call branch;
means for creating a further call branch between the pivot and release nodes;
means for connecting said further call branch to the first call branch;
means for connecting said further call branch to the third call branch; and
means for performing one of:
parking said fourth call branch at the pivot node; and
releasing said fourth call branch.

16. The network of claim 15, wherein said second switching means further comprises means for validating said second information to determine the permissibility of switching the call.

* * * * *